(12) United States Patent
Miyamoto et al.

(10) Patent No.: US 6,229,963 B1
(45) Date of Patent: *May 8, 2001

(54) DISPLAY DEVICE FOR A CAMERA

(75) Inventors: Hidenori Miyamoto, Urayasu; Hiroshi Wakabayashi, Yokohama, both of (JP)

(73) Assignee: Nikon Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/770,636

(22) Filed: Dec. 19, 1996

Related U.S. Application Data

(63) Continuation of application No. 08/187,729, filed on Jan. 28, 1994, now abandoned.

(30) Foreign Application Priority Data

Jan. 28, 1993 (JP) .................................................... 5-012902

(51) Int. Cl.[7] .................................................. G03B 17/18
(52) U.S. Cl. ............................................................ 396/292
(58) Field of Search ..................................... 396/292, 281, 396/287, 288, 291, 434

(56) References Cited

U.S. PATENT DOCUMENTS

| 4,192,606 | * | 3/1980 | Lewis | 355/40 |
|---|---|---|---|---|
| 4,215,920 | * | 8/1980 | Butler | 352/92 |
| 4,365,881 | * | 12/1982 | Hazama et al. | 354/76 |
| 4,945,373 | * | 7/1990 | Hashimoto | 354/217 |
| 5,040,006 | * | 8/1991 | Matsumura et al. | 354/106 |
| 5,396,305 | * | 3/1995 | Egawa | 354/76 |
| 5,579,066 | * | 11/1996 | Miyamoto et al. | 396/279 |
| 5,600,386 | * | 2/1997 | Saito et al. | 396/315 |
| 5,678,092 | * | 10/1997 | Kim et al. | 396/287 |
| 5,745,809 | * | 4/1998 | Kawahata | 396/287 |

FOREIGN PATENT DOCUMENTS

| 60-74140 | | 5/1985 | (JP) . | |
| 0240231 | * | 10/1986 | (JP) | 354/475 |
| 3-233535 | | 10/1991 | (JP) . | |

OTHER PUBLICATIONS

Olympus Zoom2000 owners manual, Aug. 1993.*

Syashinkagaku magazine, vol. 49, No. 1, "Camera Test EOS1000" (1991).

Konica instruction manual of Big Mini BM–201, pp. 51–54.

* cited by examiner

Primary Examiner—Christopher E. Mahoney

(57) ABSTRACT

A display device for a camera including a multiple section display that displays data arranged in a specified direction. A control unit controls the multiple section display to display date data or a count of the frames of film. The count of the frames of film is displayed in the center of the multiple section display so that it is easy to see.

5 Claims, 2 Drawing Sheets

DISPLAY DEVICE FOR A CAMERA

This application is a continuation of application Ser. No. 08/187,729, filed Jan. 28, 1994, now abandoned.

BACKGROUND OF THE INVENTION

1. Field of the Invention

The present invention relates to a camera having a display device. More particularly, the present invention relates to a camera having a liquid crystal display (LCD) that is switched from a date display to a photographic film count display. This allows the photographic film count to be easily seen.

2. Description of the Related Art

Liquid crystal displays (LCDs) are often used to inform a photographer of photographing information of a camera. These displays can include a date display that displays year/month/date and a photographic film count display that displays the number of the frame of the film to be photographed. The date display and the photographic film count display are simultaneously displayed on the same liquid crystal display device. By doing so, however, there is a possibility that a part of the date display can be mistaken as a photographic film count display and vice versa.

SUMMARY OF THE INVENTION

It is an object of the present invention to provide a camera having a display device that is easy to switch between a date display and a photographic film count display.

It is another object of the present invention to provide a camera in which the date display and count display are easy to see.

To achieve the above-mentioned objects of the present invention, the present invention provides a display device for a camera comprising display means including a multiple section display for displaying data in a specified direction and as embodied herein the data includes at least a photographic film count. Control means is provided to control the display means for displaying the photographic film count in the center of the multiple section display. The multiple section display is also used for displaying a date. The date and film count are displayed during different control operations. Thus, the size of the overall area for the multiple section display becomes smaller and the photographic film count display is easy to see.

BRIEF DESCRIPTION OF THE DRAWINGS

These and other objects and advantages of the invention will become apparent and more readily appreciated from the following description of the preferred embodiment, taken in conjunction with the accompanying drawings of which.

DESCRIPTION OF THE PREFERRED EMBODIMENT

Reference will now be made in detail to the present preferred embodiment of the invention, an example of which is illustrated in the accompanying drawings.

Figure 1:
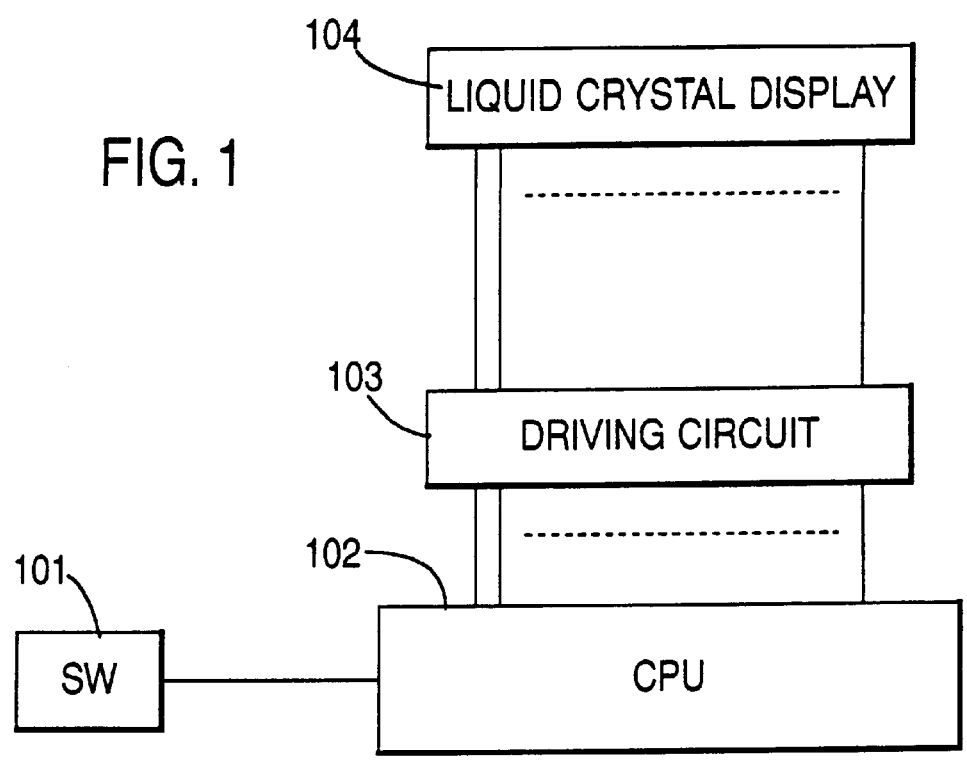
FIG. 1 is a block diagram of a preferred embodiment of a camera according to the present invention.

FIG. 1 is a block diagram of a display device for a camera according to the preferred embodiment of the present invention. A driving circuit 103 is provided for a liquid crystal display 104 to drive the liquid crystal display 104. The driving circuit 103 is controlled by a CPU 102. Main switch (SW) 101 is used to operate the CPU 102.

Figure 2:
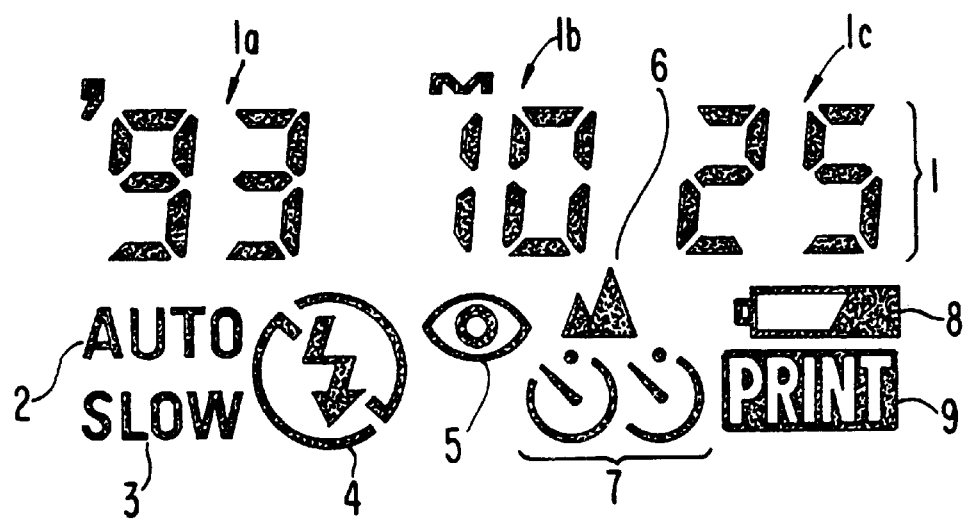
FIG. 2 is a diagram showing a liquid crystal date display.

FIG. 2 is a diagram of the liquid crystal display 104. In FIG. 2, the camera is in a state where main switch 101, which enables shooting operations, is turned OFF. At this time, the liquid crystal display 104 is controlled by the CPU 102 to display a date. A multiple section display 1 includes sections 1a, 1b and 1c which indicate year, month, and day, respectively. Each section includes a two-digit segment. The display format of each section is switchable. For example, from month/day/year to day/month/year to day/hour/minute. Each display format is read from left to right by changing modes using a mode switch (not shown). A display section 2, a display section 3, and a display section 4 indicate a light emitting mode of the speed of a flash. A display section 5 indicates a red-eye reduction mode. A display section 6 indicates a forced infinity distance mode. A display section 7 indicates a self-timer mode. A display section 8 indicates a remaining charge availability for batteries, and a display section 9 indicates whether or not the state of imprinting is activated.

Figure 3:
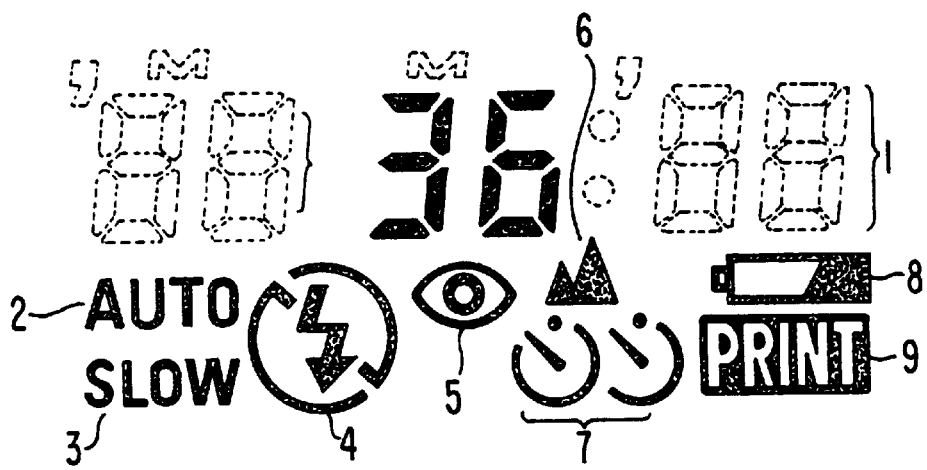
FIG. 3 is a diagram showing a liquid crystal count display.

FIG. 3 is a diagram showing the liquid crystal display 104 when the main switch 101 is in an ON state. In FIG. 3, the number of the photographic frame (the photographic film count) is displayed in the middle of the liquid crystal display 104. The display is changed with every photographic operation, e.g., every time a picture is taken.

Figure 4:
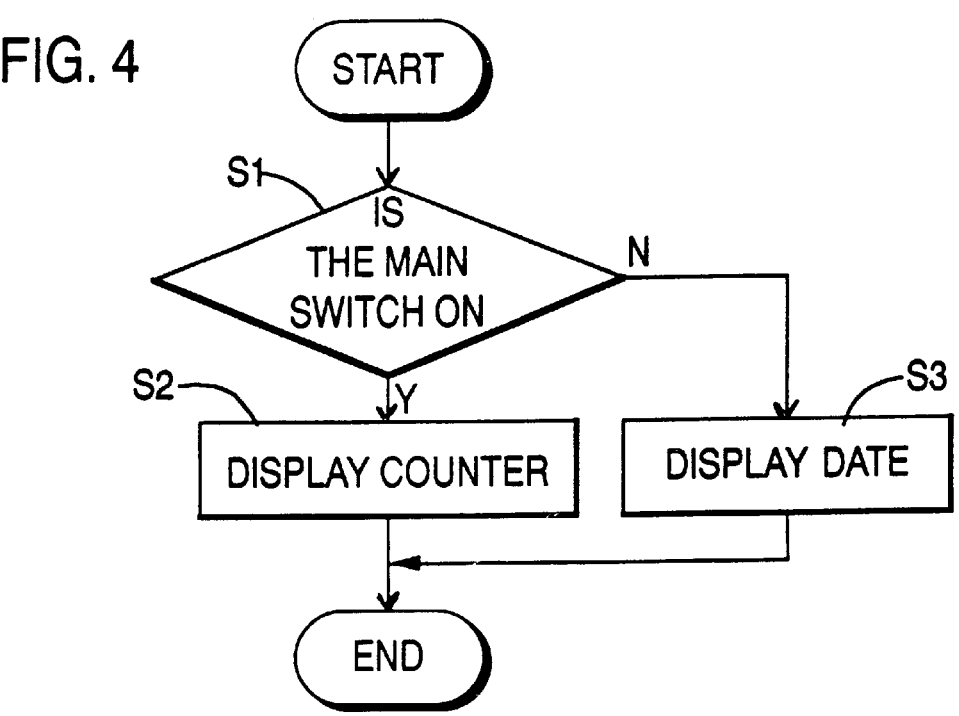
FIG. 4 is a flow chart explaining the operation of the preferred embodiment of the present invention.

FIG. 4 is a flow chart explaining the operations related to the preferred embodiment of the present invention. Operation of the display is started when the main switch 101 is operated. It is determined at step S1 whether or not the main switch 101 is turned ON. If the main switch 101 is ON, the CPU 102, at step S2, directs a count of the frame of film to be photographed to be displayed at the multiple section display 1, thereby displaying the state shown in FIG. 3. If it is determined at step S1 that the main switch 101 is OFF, the CPU 102, at step S3, directs a date to be displayed in the multiple section display 1, thereby displaying the state shown in FIG. 2.

If the photographic film count is displayed on the left or right side of the multiple section display 1, it may be difficult to see the count from a diagonal direction. Consequently, if the photographic film count is displayed in the center of the multiple section display 1, as in the preferred embodiment of the present invention and shown in FIG. 3, the photographic film count is easy to see. In this embodiment of the present invention, since the photographic film count is displayed in the center of the multiple section display 1 which is comprised of at least three two-digit segments, the count is extremely easy to see.

As described above, according to the present invention, a single display for separately displaying a date and a photographic film count is effective even as the liquid crystal becomes smaller, thereby reducing cost. Also, since the photographic film count display is easy to see, the operability of the camera is improved.

Although a preferred embodiment of the present invention has been shown and described, it will be appreciated by those skilled in the art that changes may be made in this embodiment without departing from the principles and spirit of the invention, the scope of which is defined in the appended claims and their equivalents.

What is claimed is:

1. A display device for a camera, comprising:

a display unit, including a multiple section display having display sections each having at least two segments, which displays a date and a film count, wherein at least one of said display sections displays both the date and the film count;

a control unit, coupled to said display unit, which controls said display unit to display the film count, using only a center portion of said multiple section display, causing said display unit to change the film count on said multiple section display with every photographic operation, and allow each display format of each display section to be switchable in displaying the data on the display unit; and a main switch to operate said control unit,
wherein said control unit displays the date when said main switch is OFF and displays the film count when said main switch is ON.

2. A display device for a camera, comprising:

a display unit, including a multiple section display having display sections, which displays date data in a switchable display format and film count data using only a center portion of said multiple section display, wherein at least one of said display sections displays both the date and the film count;

a control unit, connected to said display unit, which causes said display unit to change the film count data on said multiple section display with each photographic operation, and switches a display format of the date in each of said display sections in response to an input from a user; and a main switch to operate said control unit, wherein said control unit displays the date data when said main switch is OFF and displays the film count data when said main switch is ON.

3. A display device for a camera according to claim 2, wherein said multiple section display includes three display sections in the switchable display format, each display section having at least two segments, and wherein the date is displayed using the three display sections and the film count is displayed using the center display section of the three display sections.

4. A display device for a camera having a main switch, comprising:

a display unit displaying at least first and second states of the camera, said display unit can display the first state only under an OFF position of the main switch and can display the second state using only a center portion of said display unit under an ON position of the main switch.

5. The display device as claimed in claim 4, wherein the first state is a date setting state and the second state is a film count state.

* * * * *